Nov. 11, 1969  C. W. TERRY  3,477,283
GROUND SURFACE HARDNESS TESTER
Filed April 21, 1965  2 Sheets-Sheet 1

INVENTOR.
CRYL W. TERRY
BY HIS ATTORNEY

INVENTOR.
CRYL W. TERRY
BY HIS ATTORNEY

United States Patent Office 3,477,283
Patented Nov. 11, 1969

3,477,283
GROUND SURFACE HARDNESS TESTER
Cyrl W. Terry, Oxnard, Calif., assignor to the United States of America as represented by the Secretary of the Navy
Filed Apr. 21, 1965, Ser. No. 449,900
Int. Cl. G01n 3/00
U.S. Cl. 73—84                   5 Claims

ABSTRACT OF THE DISCLOSURE

The present invention relates to a ground surface hardness tester which is mounted to the wheel of a vehicle. With each revolution of the wheel the tester penetrates the ground surface and the depth of penetration indicates the surface's load carrying characteristics. The tester includes a penetrating rod which is mounted on the wheel so that it is extendable beyond the periphery of the wheel. The rod is biased outwardly from the wheel axis and means are provided for indicating the penetration of the rod into the ground surface. Additional means are provided to prevent any significant abrasion of the penetrating rod end as the wheel rotates.

---

The invention described herein may be manufactured and used by or for the Government of the United States of America for governmental purposes without the payment of any royalties thereon or therefor.

The present invention relates to a ground surface hardness tester and more particularly to a tester for rapidly determining the load carrying capacity of said ground surface.

Prior to conducting operations on various surfaces of the earth it is often quite necessary to make a rapid assessment as to the load carrying capacity of the surface. As examples, an aircraft runway, which has been covered with snow, should be tested for the compaction of the snow prior to landing an aircraft thereon, and roads or areas of doubtful load carrying capacity should be tested prior to moving troops and equipment thereover. Various forms of manually operated probes and penetrometers have been devised and used for determining surface hardness. Such an approach has, in many instances, been patently inadequate because of the long time required to take measurements and evaluate the data. When the aircraft is ready to land or troops are ordered to move over particular areas it is necessary that a quick evaluation be made of the load carrying capacity of the surfaces in question.

The present invention provides a simple apparatus which is capable of making a rapid evaluation of a ground surface prior to conducting operations thereon. This has been accomplished by providing a surface hardness tester which is mounted to the wheel of a vehicle so that, for each revolution of the wheel, the tester penetrates the surface in question and by its depth of penetration indicates whether the surface has the desired load carrying characteristics. A vehicle which has such a tester mounted to its wheel can be driven down a runway covered with snow and in a manner of minutes can provide information as to whether the snow is sufficiently compacted for the landing of an aircraft. Further, the attachment of such a tester to the wheel of a lead jeep for troop movements can determine whether the surface over which the jeep is driven has the load carrying capacity to support troops and equipment which follow. The present invention offers a significant advantage in any type of operation where the surface hardness of the earth must be quickly determined.

An object of the present invention is to provide a surface hardness tester which is capable of making a rapid assessment of the load carrying capacity of said surface;

Another object is to provide, in combination with a vehicle wheel, a surface hardness tester which is capable of penetrating the surface for each revolution of the wheel and indicating the load carrying capacity thereof;

A further object is to provide a wheel mountable surface hardness tester which is capable of indicating on a Go, No-Go basis whether operations can be conducted on a surface in question;

Other objects, advantages and novel features of the invention will become apparent from the following detailed description of the invention when considered in conjunction with the accompanying drawings wherein.

Figure 1:
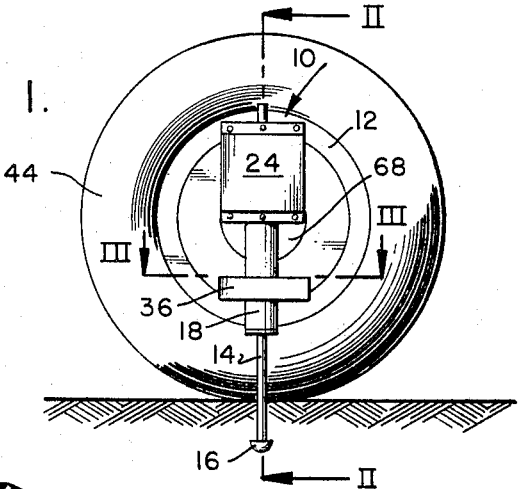
FIG. 1 is a side view of a vehicle wheel with the surface hardness tester mounted thereon.

Referring now to the drawings wherein like reference numerals designate like or similar parts throughout the several views, there is shown in FIG. 1 a surface hardness tester, generally indicated at 10, which is mounted to a vehicle wheel 12, the wheel 12 including the tire for the purposes of this description. The surface hardness tester 10 may include a surface penetrating rod 14 which may have a lower rounded tip end 16 which is adapted to penetrate downwardly into earth surfaces such as snow or soil. The penetrating rod 14 extends through a hollow cylindrical casing 18 which has end bearings 20 for guiding reciprocal movement of the rod.

Figure 2:
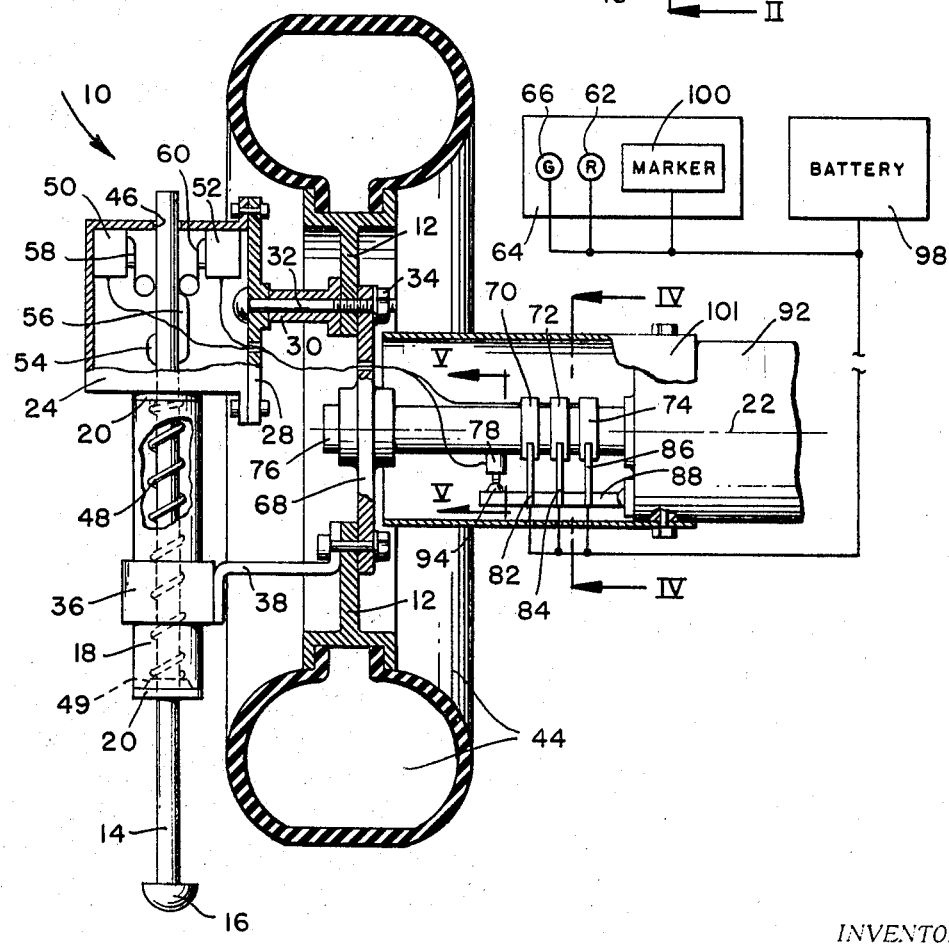
FIG. 2 is a cross-sectional view of the wheel and a side view of the surface hardness tester and wheel axle with portions broken away to illustrate various features.

A means is provided for mounting the penetrating rod 14 to the vehicle wheel 12 so that the rod has longitudinal movement along a line which is substantially perpendicular to the wheel axis 22. The mounting means may include a cylindrical-like housing 24 (for components to be described hereinafter) which is connected to the wheel 12 and the rod casing 18. As shown in FIG. 2, the housing 24 has a removable end plate 28. Extending through the end plate 28, a spacer bushing 30 and the wheel 12 is a bolt 32 which has only a sufficient number of threads so that when a nut 34 is threaded thereon these elements make sliding engagement with one another. The bolt 32 may extend substantially parallel to the wheel axis 22. In this manner the penetrating rod 14 is adapted to rotate about the axis of the bolt 32 for a purpose to be described hereinafter.

Figure 3:
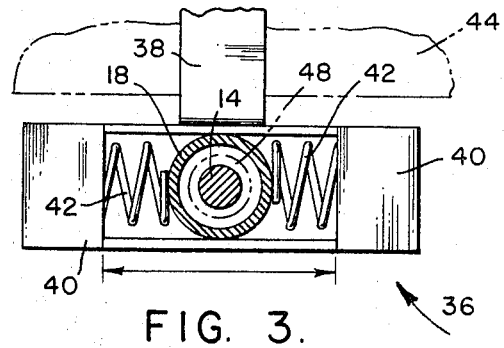
FIG. 3 is a view taken along plane III—III of FIG. 1.

The mounting means may also include a retainer assembly 36 which is connected to the wheel 12 by a Z-type connector 38 and which slidably receives the rod casing 18 and allows the rod 14 to rotate about the bolt 32 within predetermined limits. As shown in FIG. 3, the retainer 36 has a central open portion which receives the casing 18 and has end portions 40 for limiting the movement of the casing and providing a housing for a pair of compression springs 42. The compression springs 42 may be of equal strength and may extend between an end of the retainer 36 and one side of the rod casing 18 for resiliently resisting rotatable movement of the rod 14 about the bolt 32.

The points of connection of the housing 24 and the retainer 36 to the wheel 12 should be such that the penetrating rod, in its normal position, extends axially through and perpendicular to the wheel axis 22. As shown in FIG. 2, the penetrating rod end 16 should be adapted to extend beyond the periphery of the wheel 12, the wheel in this description including a tire 44. If desired, the housing 24 may be provided with an opening 46 so that an opposite end of the rod 14 may extend therethrough.

A means is provided for biasing the penetrating rod 14 outwardly from the wheel axis 22 so that the rod end 16 is adapted to contact and penetrate the ground surface as the vehicle wheel rolls thereover. This may be accomplished by a compression spring 48 which is located within the casing 18 between the upper bearing 20 and a penetrating rod flange portion 49. Accordingly, as the penetrating rod 14 is pushed upwardly the annular flange 49 will push against the spring 48 to provide the biasing effect.

It can be visualized from FIG. 1 that when the rod end 16 makes initial contact with the ground surface, the penetrating rod 14 will be located at a lead angle from the vertical position shown in FIG. 1. If the penetrating rod 14 and its casing 18 were to be rigidly fixed to the wheel 12, the rod end 16 would undergo a degree of abrasion by sliding within the ground surface between the lead angle and the vertical position. The rotatable mounting of the penetrating rod 14 at the bolt 32 and the rotatable action afforded by the retainer 36 and springs 42 minimize this abrasion. When the rod end 16 makes initial contact with the ground surface the rod casing 18 is biased against one of the springs 42 toward one of the retainer end portions 40. It is desirable that the retainer end portions 40 be so spaced from the rod casing 18 that the rod end 16 penetrates the surface at the point of its initial contact, thereby avoiding any substantial abrasion.

As the wheel 12 rotates the penetrating rod 14 will come into contact with the surface of the earth, once for each revolution of the wheel. When this contact is made the degree of penetration of the rod end 16 into the ground surface will be an indication of the load carrying capacity thereof. When the rod end 16 penetrates deeply into the surface the indication is that the surface has a low load carrying capacity and when the rod end 16 penetrates slightly into the surface the indication is that the surface has a high load carrying capacity. What is considered low or high load carrying capacity, of course, depends upon the operations to be conducted and, accordingly, the spring 48 should be designed to a predetermined strength for the mission to be performed.

It is desirable to provide the hardness tester 10 with a means for indicating the peneration of the rod end 16 into the surface. The indicating means may include a pair of switches 50 and 52 which are responsive to longitudinal movement of the penetrating rod 14. The penetrating rod 14 may have a pair of oppositely positioned cams 54 and 56 and the switches 50 and 52 may be so mounted within the housing 24 that an actuating lever arm 58 of the switch 50 is adapted to be actuated by the cam 54 and a lever arm 60 of the switch 52 is adapted to be cammed by the cam 56. As shown in FIG. 2, the cam 54 is spaced from the switch lever arm 58 and the cam 56 is located substantially adjacent the lever arm 60 when the penetrating rod 14 is in its fully extended normal position. In this position neither of the switches 50 or 52 is actuated, however upon a slight upward movement of the penetrating rod 14 the cam 56 will move the lever arm 60 to actuate the switch 52. As will be explained in more detail hereinafter, this action causes a red light 62 within a console 64 to be lit. Any movement of the penetrating rod before the cam 54 actuates the switch 50 will maintain the red light 62 in an On condition and 66 in an Off condition. This will indicate that the ground surface does not have the proper load carrying capacity for operations to be conducted thereon. When the cam 54 actuates the switch 50 the red light is turned off and the green light is turned on to indicate that the surface has the proper load carrying capacity.

Figure 4:
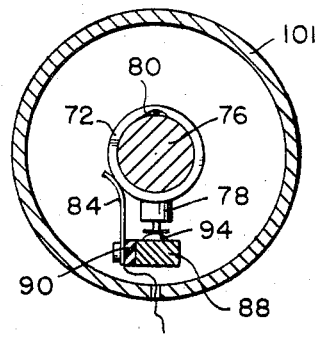
FIG. 4 is a view taken along plane IV—IV of FIG. 2.

Since it is desirable to mount the console 64 in the cabin area of the vehicle it is necessary that the response of the switches 50 and 52 somehow be transmitted to the console. This may be accomplished by a slip ring arrangement as shown in FIG. 2. Leads from the switches 50 and 52 may extend through the axle hub 68 and may be connected to a series of slip rings 70, 72 and 74 which are mounted about the axle 76. Further, leads from the switches 50 and 52 may be connected to a switch 78 for purposes to be described hereinafter. As shown in FIG. 4, the slip ring 72 may have a transverse opening 80 so as to allow a lead extending therethrough to be connected to the slip ring 74. The slip ring 70 may be constructed in a similar manner.

Figure 5:
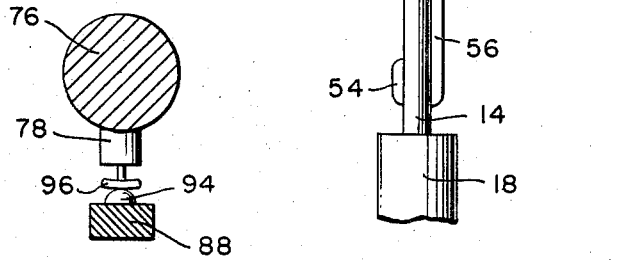
FIG. 5 is a view taken along plane V—V of FIG. 2.

A series of brushes 82, 84 and 86 may be connected to a counting bracket 88 so that they will wipe in electrical contact with the rings 70, 72 and 74, respectively. Each brush 82, 84 and 86 may be connected to the bracket 88 by a screw with a pad of insulation 90 therebetween. The mounting bracket 88 may be mounted directly to an axle casing 92 by a bolt and an opposite end of the bracket 88 may be provided with a cam 94 for periodically actuating the switch 78 as the axle 76 rotates. As shown in FIG. 5, the plunger of the switch 78 is provided with an arcuate cam follower 96 of a length sufficient to cause the switch 78 to close just prior to the rod 14 reaching its downward vertical position. By this arrangement the red light 62 will be prevented from flickering if the ground surface is sufficiently hard to give a green light indication.

Leads are attached to each one of the brushes 82, 84 and 86 and extend into the vehicle cabin area to make contact with the lights 62 and 66 as well as a battery 98 and a marker 100. A split tubular housing 101 may be bolted to the axle casing 92 for shielding the brush element from dirt or debris.

If desired, a radio transmission system could be used in lieu of the slip ring arrangement just described. In such an instance a small radio transmitter would be mounted on the housing 24 for response to the actuation of switches 50 and 52 and a small receiver in the vehicle cabin area would be used to receive the transmissions for operating the lights 62 and 66 as well as the marker 100.

Figure 6:
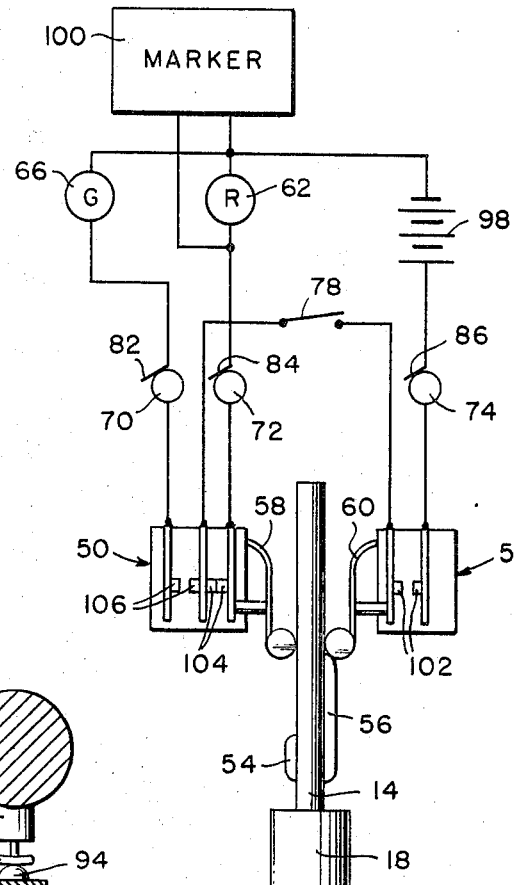
FIG. 6 is a schematic illustration of the electrical circuitry which may be used for the surface hardness tester.

FIG. 6 is a schematic illustration of circuitry which may be employed in the surface hardness tester 10. As shown, the switch 52 may be a single pole, single throw type and the switch 50 may be a single pole double throw type. When the cam 56 actuates the switch 52 a pair of contacts 102 are closed and the switch 50 has a pair of contacts 104 which are normally in the closed position. As soon as the penetrating rod 14 nears the downward vertical position the switch 78 is closed, as discussed hereinabove. Accordingly, when the ground surface is soft switches 52 and 78 are closed so that electrical connection is made between the battery 98, the red light 62 and the marker 100. It is to be noted that during this period contacts 106 of switch 50 are open so that the green light 66 is off. When the ground surface is hard switches 50 and 78 are closed at which time the contacts 104 break and the contacts 106 come into engagement. Now the circuit to the red light 62 and the marker 100 is broken and a circiut to the green light 66 is completed. Accordingly, when the penetrating rod end 16 has penetrated the ground to a large extent the red light 62 is on and the marker 100 will operate, and when the penetrating rod has penetrated the ground surface to a lesser extent the green light 66 will turn on and the red light 62 will turn off. In this manner the operator of the vehicle can visually determine the load carrying capacity of the ground surface over which he is driving and when the red light is on he may make speedometer readings or utilize the marker 100 to record the soft areas. The marker 100 may include a longitudinal solenoid with a marking pen on the solenoid end to make a mark each time the red light 62 is turned on. This mark may be made upon a transversely moving chart which is actuated by the vehicle speedometer cable.

It should be noted that the spring 48 may be designed for varying stiffnesses depending upon the desired load carrying capacity of the ground surface. If the ground surface is required to have a high load carrying capacity, a stiff compression spring 48 may be employed, however if the desired load carrying capacity of the ground surface is less, a weaker spring 48 may be employed. Variations in the operation of the tester could also be accomplished, however, by employing a penetrating rod 14 having differently positioned cams 54 and 56. Accordingly, different penetrating rods 14 could be replaced to obtain the required indications rather than replacing the compression spring 48.

It is now readily apparent that the present invention provides a surface hardness tester which is capable of making a very quick assessment of a given area of ground surface. By driving the vehicle over the ground area of snow or soil the surface hardness tester will provide positive indications as to whether the ground surface has the desired load carrying capacity. This assessment of the ground surface enables operations to be conducted without undue delay for testing purposes.

I claim:
1. For use with a wheel of a driver-operated vehicle, a ground surface hardness tester comprising:
    a ground surface penetrating rod;
    means for mounting said rod to a vehicle wheel so that the rod can have longitudinal movement along a line which is substantially perpendicular to the wheel axis;
    said rod, upon mounting, having an end which is extendable beyond the periphery of the wheel;
    means for biasing the rod outwardly from the wheel axis so that the rod end is adapted to contact and penetrate the ground surface as the vehicle wheel rolls thereover;
    means carried by said vehicle in convenient proximity to said driver for indicating the penetration of the rod end into said ground surface; and
    electrically controlled means actuated by said penetration of said rod for controlling said indicating means,
    whereby said driver is capable of testing surface hardness by driving said vehicle wheel over the surface and simultaneously noting the rod penetration response of said indicating means.

2. A ground surface hardness tester as claimed in claim 1 wherein:
    the mounting means mounts the rod rotatably about an axis which is substantially parallel to said wheel axis; and
    including spring means connected to the wheel for resiliently resisting the rotatable movement of the rod.

3. A ground surface hardness tester as claimed in claim 1 wherein the electrically controlled means includes:
    switch means actuatable by said rod when the rod end has penetrated the ground surface to a predetermined depth.

4. A ground surface hardness tester as claimed in claim 2 wherein:
    said rod has a pair of camming surfaces for actuating said switch means, one of the camming surfaces actuating the switch means when the rod end penetrates the ground surface below a tolerable depth and the other camming surface actuating the switch means when the rod end penetrates the ground surface above said tolerable depth.

5. In combination with the wheel of a vehicle, a ground surface hardness tester comprising:
    a ground surface penetrating rod;
    means mounting the rod to said wheel so that the rod has a longitudinal movement along a line which is substantially perpendicular to the wheel axis, said mounting means mounting the rod rotatably about an axis which is substantially parallel to said wheel axis and including spring means connected to the wheel for resiliently resisting the rotatable movement of the rod;
    said rod having an end which is extendable beyond the periphery of the wheel;
    means biasing the rod outwardly from the wheel axis so that the rod end contacts and penetrates the ground surface as the vehicle wheel rolls thereover;
    means, responsive to the longitudinal movement of the rod, for indicating the penetration of the rod end into the said ground surface, the indicating means including switch means actuatable by said rod when the rod end has penetrated the ground surface to a predetermined depth; and
    said rod having a pair of camming surfaces for actuating said switch means, one of the camming surfaces actuating the switch means when the rod end penetrates the ground surface below a tolerable depth and the other camming surface actuating the switch means when the rod end penetrates the ground surface above said tolerable depth.

References Cited
UNITED STATES PATENTS

| | | | |
|---|---|---|---|
| 1,301,554 | 4/1919 | Good | 301—51 |
| 2,130,751 | 9/1938 | Van der Meer | 73—84 |
| 2,280,592 | 4/1942 | Mieux | 73—84 |
| 3,018,340 | 1/1962 | Eggert et al. | 200—38 |
| 3,055,994 | 9/1962 | Lundeen | 200—38 |
| 3,077,771 | 2/1963 | Ernst | 73—81 |

RICHARD C. QUEISSER, Primary Examiner

VICTOR J. TOTH, Assistant Examiner